Patented Nov. 24, 1925.

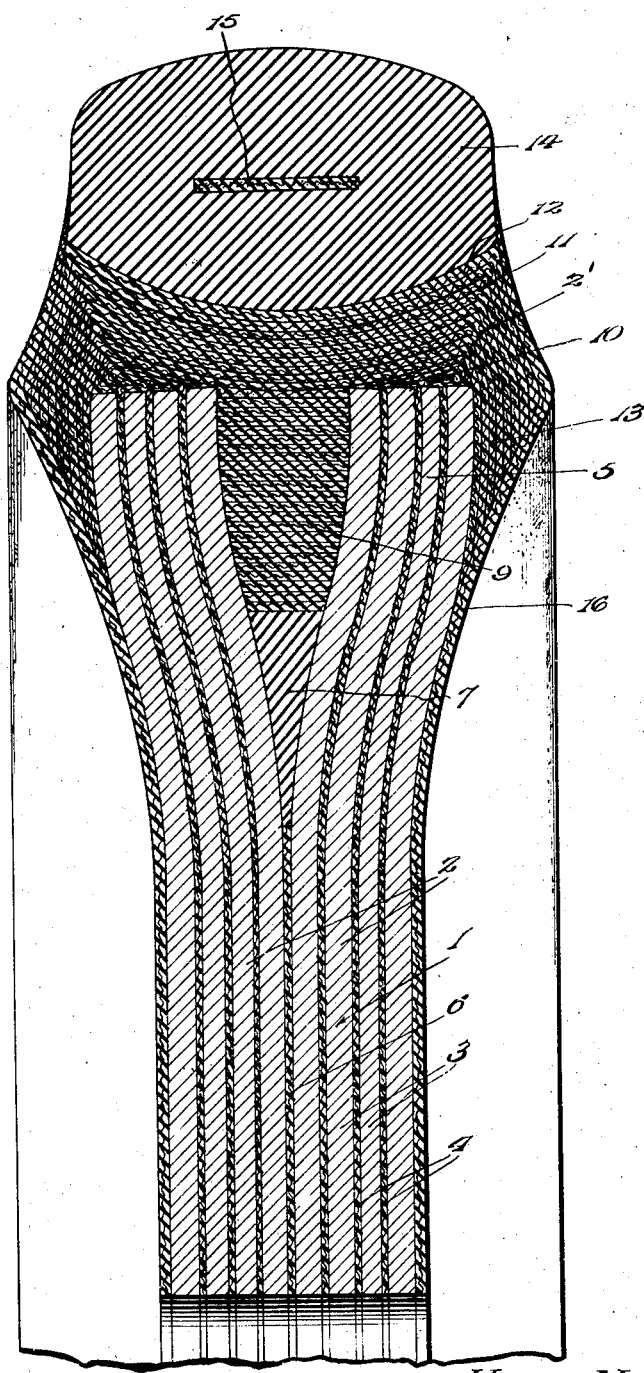

1,562,674

UNITED STATES PATENT OFFICE.

HARRY N. ATWOOD, OF MONSON, MASSACHUSETTS, ASSIGNOR TO RUBWOOD, INC., OF LAWRENCE, MASSACHUSETTS, A CORPORATION OF MASSACHUSETTS.

SOLID-TIRE VEHICLE WHEEL.

Application filed August 23, 1923, Serial No. 658,947. Renewed February 18, 1925.

*To all whom it may concern:*

Be it known that I, HARRY N. ATWOOD, a citizen of the United States, residing at Monson, in the county of Hampden and State of Massachusetts, have invented certain new and useful Improvements in Solid-Tire Vehicle Wheels, of which the following is a specification.

This invention relates to improvements in vehicle wheels of the solid tire type.

The ordinary vehicle wheel of the solid tire type comprises a body, a rim, and a solid tread. The body in some instances is made up of wood spokes and a felloe, and is equipped with such appurtenances as are necessary to mount the wheel upon the axle spindle and to secure the rim in place upon the felloe, and the rim is of metal and is fitted onto the felloe and has molded upon it a tread which is of solid rubber. In other types the wheel body is made up of a number of wood discs facially united and provided with a felloe supporting the said metallic rim and the rubber tread thereon. In still another type the body is of pressed steel or made up of an assemblage of metallic parts, and likewise is equipped with a rim and a rubber tread thereon. In all of these well known structures the entire body of the wheel and the rim are of rigid non-yielding material, and the only element of the wheel, considered in its entirety, which possesses any shock-absorbing and cushioning qualities, is the solid rubber tread. Because of the solid nature of the tread, however, the cushioning effect of the same is practically negligible. As a consequence shocks and vibrations are transmitted, with substantially undiminished force, to the running gear of the automotive vehicle with a consequent injury to the said running gear and a loosening and distortioning of its component parts. It is not practical to employ other than a solid rubber tread in a wheel designed for such use. It therefore follows that an ideal wheel structure for use on trucks would be one which would possess the required degree of strength and would at the same time have its body so constructed as to absorb to a maximum degree the shocks, impacts, and vibrations incident to travel of the wheel over the road surface and thus prevent the transmission of these disturbing forces to the running gear of the automotive vehicle, and it is the general object of the present invention to provide a wheel possessing these desirable qualities.

Another equally important object of the invention is to provide a wheel of the solid tire type in which the body, rim, and tread will all constitute an integral whole, the several component parts being intimately and integrally bonded to one another, so that the disadvantages of a metallic rim which must be secured in place by mechanical locking devices, are wholly obviated, and there is no likelihood of relative displacement of the component parts of the wheel.

A further object of the invention is to provide an integral composite wheel structure of the solid tire type possessing a gradually increasing degree of resiliency and flexibility from its central portion to its periphery to thereby provde for more effective absorption of shocks, impacts, and vibrations, than is possible where a wheel body of the ordinary type is employed.

In the accompanying drawing the figure is a sectional view through substantially one-half of a wheel constructed in accordance with the present invention.

The wheel embodying the invention comprises a body which is indicated in general by the numeral 1, and a tread which is indicated in general by the numeral 2', these portions of the wheel being formed into an integral and composite whole and constituting, in themselves, the complete wheel with the exception of such fittings as are required to mount the wheel. The body 1 of the wheel comprises sections which are indicated by the numeral 2, and each of these sections is made up of a number of plies 3 of veneer or other suitable resilient body material, and bonding plies 4 which may be of rubber, rubberized fabric, or any other rubber material suitable for the purpose. In manufacturing the wheel body, the plies are cut to circular form and alternately arranged, the bonding plies 4 being of slightly greater diameter than the body plies 3 so that their peripheral portions will extend beyond the peripheries of the body plies. If the body plies have not previously been shaped to the required contour, the assemblage of body and bonding plies is subjected to heat and pressure in a suitable form so as to somewhat dish the peripheral portion of the assemblage, the dished portion being indicated by the numeral 5. The two sections are then disposed face to face and a bonding ply 6 is interposed between their mid portions. While the sections are held in this position, with their dished portions 5 bulging outwardly in opposite directions, a filling 7 of soft or uncured rubber is packed into the space between the dished peripheral portions of the sections, partly filling said space as indicated in the figure of the drawing. Rubberized fabric or the like in strip form is wound circumferentially about the structure within the space between the dished portions 5 of the two body sections until the remainder of this space is filled, thus providing a filling of a more or less resilient and yieldable nature between the peripheral portions of the body sections, the outer side of the filling being flush or in registration with the peripheries of the said sections 2.

As before stated, the bonding plies 4 are of greater diameter than the body plies, and their projecting peripheral portions are interlaid or folded over upon or within one another so as to form a cushioning and protecting shoulder 10 extending continuously about the periphery of the respective body section 2.

The tread 2' of the wheel comprises a foundation which is indicated in general by the numeral 11 and which is made up of a number of plies 12 of rubberized fabric or any other rubber material found suitable for the purpose and which is more or less nonstretching. The plies 12 are laid about the periphery of the wheel body in superimposed relation and the assemblage of plies is formed over the shoulders 10 so that side portions 13 of the assemblage will extend beside the outer faces of the sections 2, the plies being of gradually decreasing width in outward order so that the portions 3 will be of gradually decreasing thickness toward the center of the wheel structure. A cushioning tread body 14 of soft rubber is then built up upon the foundation 11, and if desired one or more reinforcing strips 15 of rubberized fabric or the like may be embedded in the said tread 14 to extend circumferentially therein. Facing plies 16 of rubberized fabric, rubber, or a composition of rubber and other materials is then applied over the two outer faces of the wheel structure, covering the outer faces of the outer plies of the body sections 2 and extending likewise over the portions 13 of the foundation 11 and part way along the opposite sides of the tread body 14. The entire assemblage of elements is then subjected to heat and pressure in a suitable mold and in this operation the component parts will be cured or vulcanized and an intimate and integral union will be effected between them so that when the product is removed from the vulcanizing mold it will constitute a complete, integral, composite wheel.

The wheel embodying the invention, being of integral structure throughout, is more substantial than the ordinary types of wheels. The body of the wheel is of such construction and made from such materials that, while exceptionally substantial and strong, it at the same time possesses a high degree of resiliency and a certain degree of yieldability and flexibility adapting it to absorb shocks which would otherwise be transmitted to the running gear of the vehicle. The filling 7 of soft rubber and the wrapped filling 9 of rubberized fabric or the like constitute a more or less yieldable and resilient sustaining means for the foundation 11 of the wheel tread, the shoulders 10 serving also as a somewhat yieldable and resilient support for this foundation. At the same time the body sections 2 of the wheel constitute a more firm support for the tread foundation. As a consequence the foundation of the tread is firmly supported and yet it is supported in a resilient and somewhat yieldable manner. Furthermore, by dishing the body sections 2 at their peripheral portions, these portions are rendered more resilient than the mid portion of the wheel body so that considering all of the cushioning features in combination, it is evident that the wheel as a whole is of increasing resiliency from its central portion to its circumference.

Having thus described the invention, what is claimed as new is:

1. In a vehicle wheel, a body comprising plies of resilient material and bonding plies uniting the same, the body being provided peripherally with a channel, a cushioning filling in said channel, and a tread surrounding the periphery of the body and sustained by the filling and the walls of the channel.

2. In a vehicle wheel, a body comprising plies of resilient material and bonding plies uniting the same, the body being provided peripherally with a channel, a cushioning filling in said channel, and a tread surrounding the periphery of the body and sustained by the filling and the walls of the channel, the said filling and the tread being integrally bonded to the walls of the channel.

3. In a vehicle wheel, a body comprising plies of resilient body material and bonding plies of rubber material, the plies comprising the body being arranged in two sections and the said sections having their peripheral portions outwardly deflected to provide a circumferential channel, a cushioning filling in said channel, and a tread surrounding and sustained by the said filling and the walls of the channel.

4. In a vehicle wheel, a body comprising plies of resilient body material and bonding plies uniting the same, the body being provided with a peripheral channel, a filling of rubber material in said channel, and a tread surrounding and sustained by the said filling and the walls of the channel.

5. In a vehicle wheel, a body comprising plies of resilient body material and bonding plies uniting the same, the body being provided with a peripheral channel, a filling of rubber material in said channel, and a tread surrounding and sustained by the said filling and the walls of the channel, the said tread comprising a foundation of substantially non-stretching rubber material extending over the peripheries of the channel walls and across the channel and the outer side of the filling therein, and a tread body of rubber upon the outer surface of the foundation.

6. In a vehicle wheel, a body comprising plies of resilient body material and bonding plies uniting the same, the body being provided with a peripheral channel, a filling of rubber material in said channel, and a tread surrounding and sustained by the said filling and the walls of the channel, the said tread comprising a foundation of substantially non-stretching rubber material extending over the peripheries of the channel walls and across the channel and the outer side of the filling therein, and a tread body of rubber upon the outer surface of the foundation, the said foundation being integrally bonded with the filling and with the said walls of the channel.

7. In a vehicle wheel, a body comprising plies of resilient material and bonding plies uniting the same, the plies being arranged in two sets at opposite sides of the mid plane of the wheel body, and the peripheral portions of the two sets being outwardly deflected in opposite directions whereby to provide a channel surrounding the periphery of the wheel body, a filling of soft rubber within the bottom of the channel, a filling comprising a strip of fabric wound within the channel about the first mentioned filling and having its outer side substantially flush with the peripheries of the walls of the channel, and a cushioning tread extending circumferentially of the body and sustained by the walls of the channel and by the filling therein.

8. In a vehicle wheel, a body comprising plies of resilient body material and bonding plies uniting the same, the body being provided with a peripheral channel, a filling of rubber material in said channel, a tread surrounding and sustained by the said filling and the walls of the channel, and a facing layer of rubber material extending over the opposite side faces of the body and over the opposite side faces of the tread and integrally bonded with said parts.

9. In a vehicle wheel, a body comprising plies of resilient body material and bonding plies of rubber material, the plies comprising the body being arranged in two sections and the said sections having their peripheral portions outwardly deflected to provide a circumferential channel, the bonding plies projecting peripherally beyond the body plies and having their projecting portions interlaid to provide cushioning and protecting shoulders extending about the peripheries of the walls of the channel, a cushioning filling in said channel, and a tread surrounding the body and sustained by said shoulders and by the said cushioning filling.

10. In a vehicle wheel, a body comprising plies of resilient body material and bonding plies of rubber material, the plies comprising the body being arranged in two sections and the said sections having their peripheral portions outwardly deflected to provide a circumferential channel, the bonding plies projecting peripherally beyond the body plies and having their projecting portions interlaid to provide cushioning and protecting shoulders extending about the peripheries of the walls of the channel, a cushioning filling in said channel, and a tread surrounding the body and sustained by said shoulders and by the said cushioning filling and integrally bonded with the outer faces of the walls of the channel.

In testimony whereof I affix my signature.

HARRY N. ATWOOD. [L. S.]